United States Patent [19]

Matsuo

[11] Patent Number: 4,723,132

[45] Date of Patent: Feb. 2, 1988

[54] METHOD AND APPARATUS FOR PREVENTING UNEVENNESS IN PRINTING DEPTH IN A THERMAL PRINTING

[75] Inventor: Satoru Matsuo, Tokyo, Japan

[73] Assignee: Kabushiki Kaisha Toshiba, Japan

[21] Appl. No.: 885,693

[22] Filed: Jul. 15, 1986

[30] Foreign Application Priority Data

Nov. 27, 1985 [JP] Japan ............................... 60-266329

[51] Int. Cl.[4] .......................... G01D 15/10; B41J 3/20

[52] U.S. Cl. ................................ 346/1.1; 346/76 PH; 400/120

[58] Field of Search ........................... 346/76 PH, 1.1; 400/120

[56] References Cited

U.S. PATENT DOCUMENTS

| | | | |
|---|---|---|---|
| 3,710,913 | 1/1973 | Brennan, Jr. et al. | 400/320 |
| 4,464,669 | 8/1984 | Sekiya et al. | 346/76 PH |
| 4,567,488 | 1/1986 | Moriguchi et al. | 346/76 PH |

*Primary Examiner*—E. A. Goldberg
*Assistant Examiner*—Gerald E. Preston
*Attorney, Agent, or Firm*—Banner, Birch, McKie & Beckett

[57] ABSTRACT

A thermal printing apparatus includes a thermal printing head with a line of heat generating elements, a data providing circuit which provides source data to be printed, and a compensating data forming circuit. The compensating data is formed from the source data and at least one line of previous source data. The compensating data and source data are provided to the printing head along with respective print enabling signals, and are printed successively.

11 Claims, 5 Drawing Figures

METHOD AND APPARATUS FOR PREVENTING UNEVENNESS IN PRINTING DEPTH IN A THERMAL PRINTING

BACKGROUND OF THE INVENTION

This invention relates to the field of thermal printing and, more particularly, to method and apparatus for preventing unevenness in printing depth in thermal printers.

Thermal printing apparatus is popularly used in facsimile receivers or other printers mainly because they are small, light, and easy to maintain. The thermal printing receivers used in facsimile apparatus and other printers have a thermal printing head which includes a line of heat generating elements, e.g., 2048 elements, and associated circuitry, i.e., registers and semiconductor switches. A line of data, each bit of which corresponds to each one of the elements, is supplied to the head along with a print enabling signal. Electric current flows through the heat generating elements to which print data is supplied when the print enabling signal is active. The elements then generate enough heat to cause a thermosensitive recording medium in contact therewith to darken. Lines of data are successively supplied to the head, along with print enabling signals, until the printing operation is completed.

Recently, there has been a need for thermal printing apparatus to print as rapidly as other printing apparatus. One method for increasing the printing speed is to reduce the driving cycle. However, it has been noted that by shortening the driving cycle unevenness in printing depth normally occurs. Because printing the current line begins at the time when heat due to printing the previous line remains, differences in temperature between previously heated elements and previously non-heated elements exists. Hence, the previously heated elements reach a higher temperature, or reach thermal saturation, sooner than previously non-heated elements. This results in unevenness in printing depth.

In order to prevent unevenness in thermal printing apparatus, it has been proposed to modulate the length or the magnitude of current to each element to be heated, in response to the presense or absence of previous printing, such that elements to be heated can generate the same magnitude of heat regardless of whether they were heated in the previous period. However, in order to do this, there is a need to provide the printing head with at least two lines of registers. Also, logic circuits are required for transforming the current data in accordance with the presence or absence of previous data. The logic circuits have to be provided so as to correspond to each bit. Moreover, when using the method of controlling the length of electric current, the printing head must be provided with a corresponding number of selecting gates for selecting one of several print enabling signals which have different active periods. When controlling the magnitude of electric current, two semiconductor switches are required for selecting either one of two current sources each having a different magnitude. Therefore, a large number of circuits must be integrated within the printing head. This would increase the cost of the printing head because the pass rate of manufactured printing heads decreases markedly in proportion to the degree of integration.

SUMMARY OF THE INVENTION

It is, therefore, an object of the present invention to provide a new thermal printing method capable of rapidly printing without unevenness in printing depth.

It is another object of the present invention to provide thermal printing apparatus capable of rapidly printing without unevenness in printing depth, which apparatus can be manufactured at low cost.

It is a further object of the present invention to provide a thermal printing method capably of compensating precisely for unevenness of printing depth while printing at a rapid rate.

According to the present invention, and in order to realize the above noted objects, thermal printing apparatus is provided which has a thermal printing head with a line of heat generating elements and includes a data providing circuit for providing data to be printed, a compensating data forming circuit and a controlling circuit. The compensating data forming circuit forms at least one line of compensating data per one line of current data. The compensating data is data which enables the printing element to print, in cooperation with a corresponding print enabling signal, when the element has received print data for the present line and has not received print data for a previous line. The controlling circuit forms at least two print enabling signals during one printing cycle time, each of which is generated at different times and are supplied successively to the printing head. The current data is supplied to the printing head by the controlling circuit so that each element can be selectively driven while the print enabling signal is active. After or before this, the compensating data is also supplied to the printing head so that each element can be selectively activated by the compensating data while the print enabling signal is active.

Thus, in the present invention, compensating data is formed for each bit of current data. The current data and the compensating data are both supplied to the printing head while the print enabling signal is active. In this way, unevenness in printing depth is preventing while printing is performed rapidly.

Further in accordance with the present invention, the data compensating circuit may be separated from the printing head, i.e., the heat generating elements. Therefore, a simple printing head with no circuitry for compensation can be used. This scarcely increases the cost of the thermal printing apparatus, even if the additional cost due to the compensating circuit is taken into consideration.

As another aspect of the invention, compensation with respect to heat generating elements which are adjacent to one another on the same line is achieved in a similar method which includes the steps of forming compensating data and printing both the current data and the compensating data while the print enabling signal is active.

DETAILED DESCRIPTION OF THE PREFERRED EMBODIMENTS

Figure 1A:
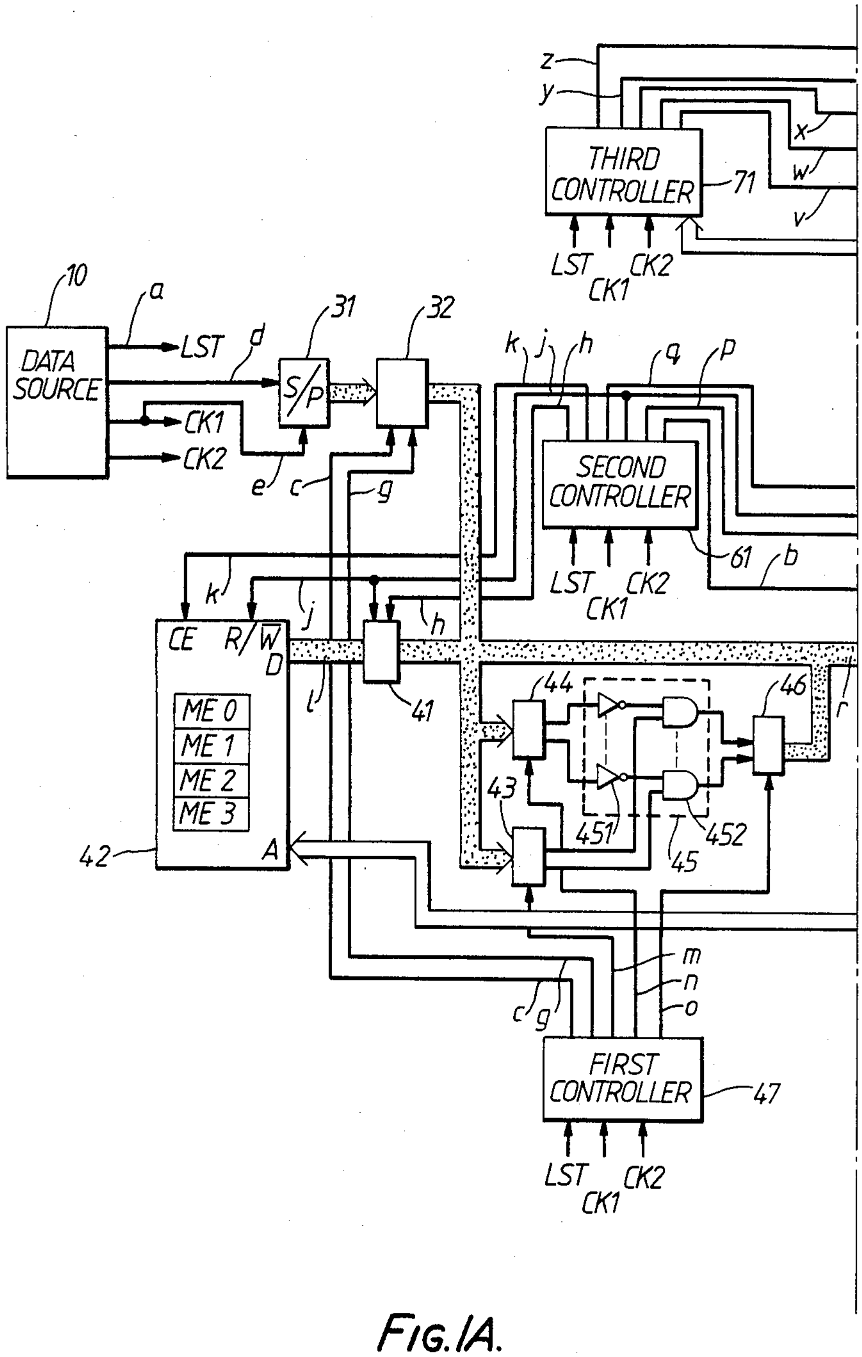
FIG. 1 shows an embodiment of the present invention in block diagram form.
Figure 1B:
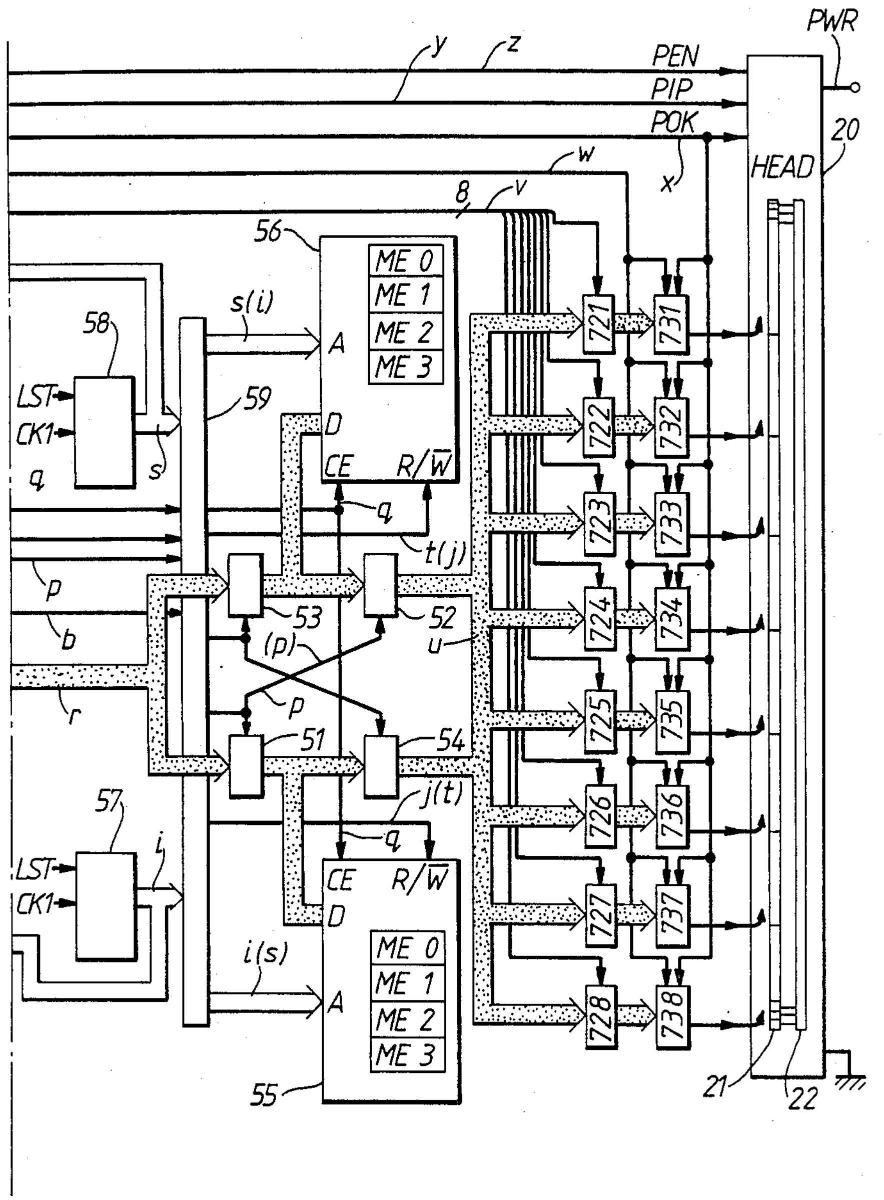

A thermal printer shown in FIG. 1, includes data source circuit 10 which generates a series of lines of data to be printed, line start pulses and a first clock as shown in FIG. 2d, FIG. 2a and FIG. 2e, respectively. Data source 10 also provides a second clock (not shown) which has a frequency which is twice that of the first clock shown in FIG. 2e. The continuous sequence of data provided by data source 10 is to be divided into a line of print data every time the line start pulse is generated. ("Line" as used herein refers to a scanning line composed of 2048 bits. It will be apparent to those skilled in the art, however, that a scan line could be composed of more or less than 2048 bits, as is known in the art.) Each bit is generated in synchronism with the first clock.

After being processed by the print data processing circuit, the print data and compensating data are supplied to a thermal printing head 20. Thermal printing head 20 basically includes a line of heat generating elements 22 and a driving circuit 21. Each heat generating element is coupled to a corresponding output of driving circuit 21. Driving circuit 21 is composed of a plurality of shift registers, latches, and switching transistors as is known in the art. The data to be printed is supplied to the shift registers of driving circuit 21 which latches the data before providing it to the appropriate driving transistor. In addition to the data, a print enabling signal is also supplied to head 20. Electric power is supplied to the heat generating elements by application of the print enabling signal to the switching transistor. If the latched data corresponds to "black", or print data, the switching transistor is enabled by the latch output and electric current flows through the heat generating element via the switching transistor. As a result, the heat generating element generates heat which causes the portion of the thermosensitive medium (not shown) which is in contact with the particular heat generating element to print a black mark.

The print data processing module provides lines of print compensating data dn the print enabling signals to printing head 20. The print data processing module includes S/P (serial to parallel) converter 31, latch/gate 32, gate 41, first memory 42, latches 43 and 44, compensating data forming circuit 45, gate 46, gates 51-54, second memory 55, third memory 56, first address counter 57, second address counter 58, selector 59, first controller 47, second controller 61, third controller 71, latch 721 through 728 and P/S (parallel to serial) converters 731 through 738.

Figure 2:
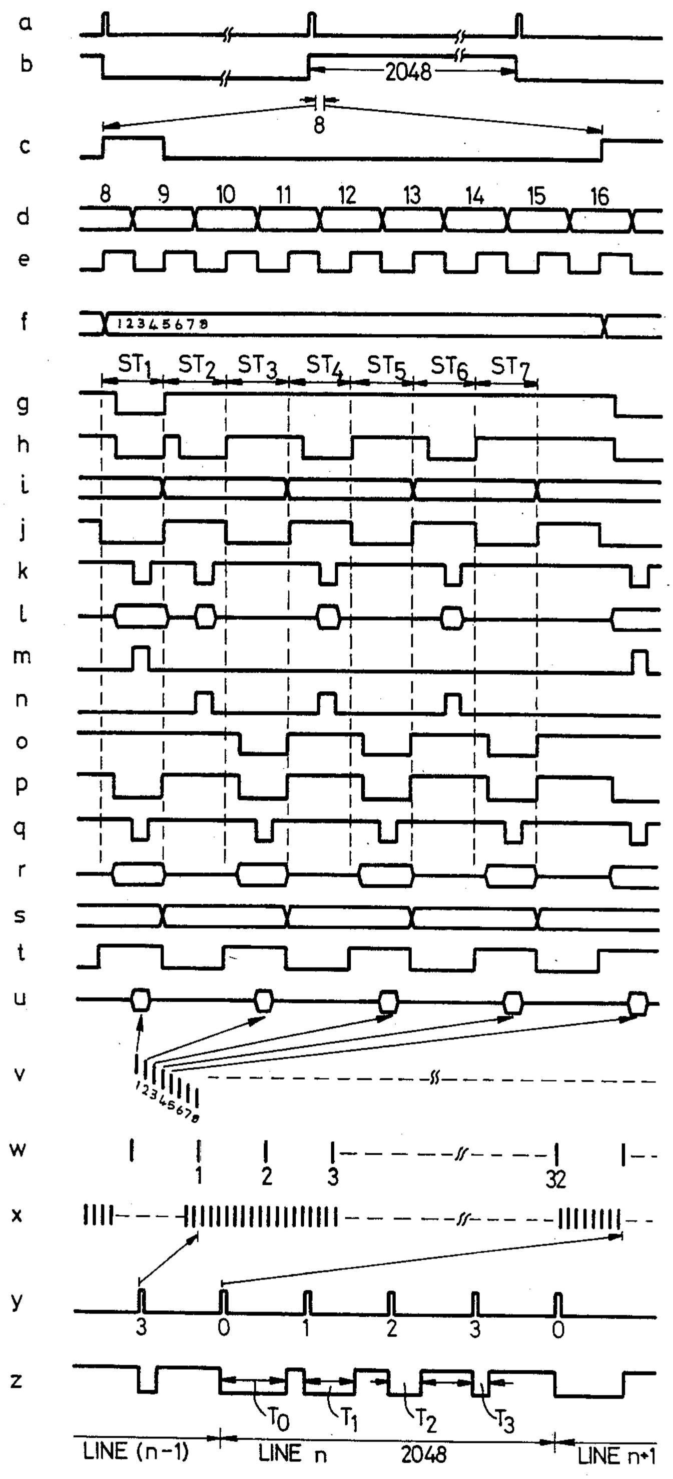
FIG. 2 (a thru z parts) is an illustration of operational timing with respect to the embodiment of FIG. 1.

The function and operation of each component will be described with reference to FIG. 2 before the description of the operation of the whole module. S/P converter 31 receives serial data d from data source 10 and converts the serially received data into data in parallel form. Latch/gate 32 first latches the parallel output of S/P converter 31 according to latch pulse c, and outputs the data during the "low" period of gate signal g. Gate 41 is a bi-directional gate which transfers the data signal in either one of both directions in response to read/write signal j. The gating operation itself is controlled by gate signal h. Namely, under the application of the gate signal h, gate 41 passes the data signal from the right side to the left side (as shown in the figure) when the read/write signal is "low", and passes the data in the opposite direction when the read/write signal is "high". First memory 42 stores the lines of data as previous print data. In this embodiment, three lines of compensating data are produced for each line of currrent data as will be described more fully below. Briefly, each line of compensating data is produced from one line of previous data in conjunction with the current data. Hence, to produce three lines of compensating data, three lines of previous data must be saved. Therefore, memory is needed to store at least three lines of previous data. First memory 42 stores four lines of data, including the current line, in areas ME0 through ME3. First Memory 42 is enabled to operate by chip enabling signal k in either read or write mode according to read/write signal j, while being supplied with address data i. Latch 43 latches the input data every time latch pulse m is provided, and maintains this data at its output until the next latch pulse m is provided. Latch 44 operates in a manner similar to latch 43 but in response to latch pulse n. As described hereinbelow, the data to be latched by latch 43 is current data whereas the data to be latched by latch 44 is previous data.

Figure 3:
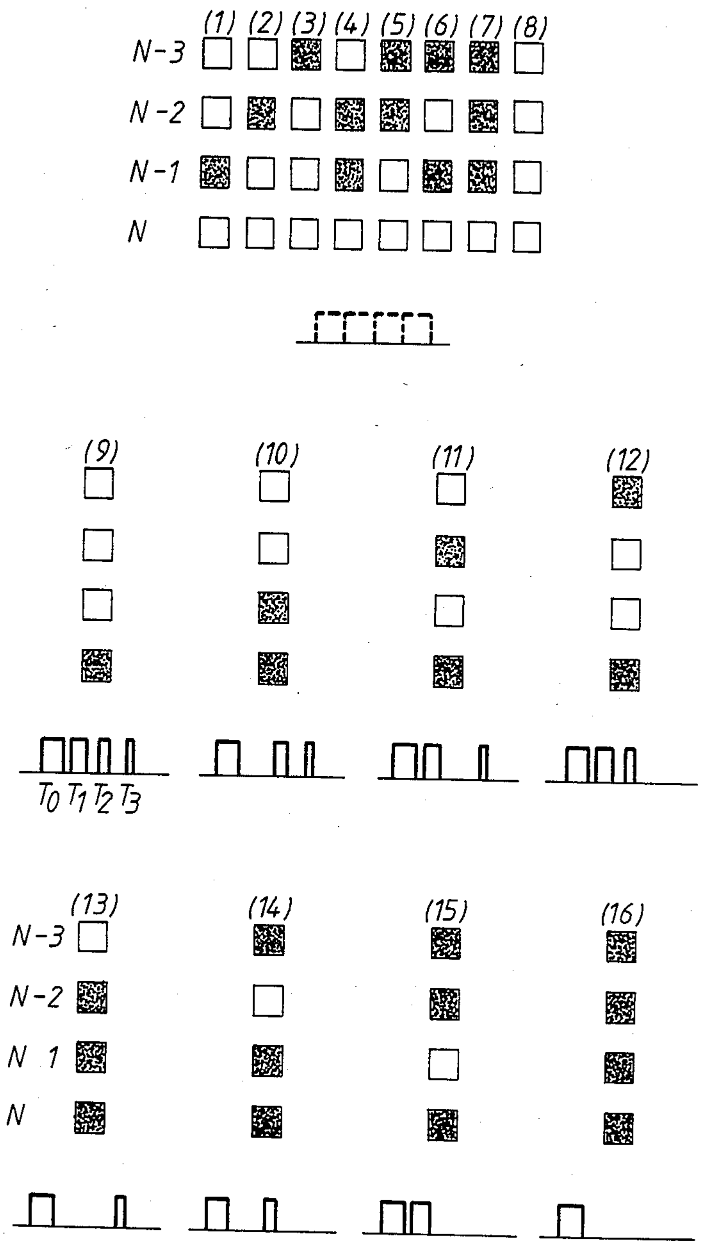
FIG. 3 (1 thru 13 parts) is an illustration of the concept of compensation in accordance with the present invention.

Compensating data forming circuit 45 forms three lines of compensating data for each line of current data. The compensating data is provided in a bit by bit fashion with each bit of compensating data being provided from a bit of current data and a corresponding bit of previous data. Referring to FIG. 3, the current line, the last line, the line before the last line and the line two lines before the last line are referred to as lines N, N−1, N−2 and N−3, respectively. The data to compensate the unevenness in print depth which would occur because of absence or presence of printing for line N−1 is provided from every bit of current line data N and the corresponding bits of previous line data N−1. similarly, data to compensate for the presence or absence of printing in line N−2 is provided from each bit of current line data N and the corresponding bits of previous line data N−2. In this embodiment, compensating data for the entire print line is not formed at the same time. Instead, the compensating data is formed eight bits at a time in a parallel manner. Further, in this embodiment, the compensating data is a logical "high" or "black", when a current bit is "high", or "black", and the corresponding bit of the previous line is "low", or "white". Therefore, compensating data forming circuit 45 includes eight inverters 451 for inverting the previous data bits and eight AND gates 452 for providing the logical AND of the inverted bits of previous data and the corresponding bits of current data. Gates 46 gate the compensating data signal according to gate signal o. First controller 47 includes a counter, decoder, flip-flop and gates. First controller 47 generates the above mentioned latch pulses c, m and n, as well as gate signal g and o on the basis of line start pulse a, first clock e and the second clock (not shown in FIG. 2).

Gates 51 and 53 are the gates for passing the input data signal to memory 55 and 56, respectively, to provide data thereto, which data is the write data. Gates 52 and 54 are the gates for passing the data read out of respective memory 56 and 55 to latches 721 through 728. Gates 51 and 52 operate to pass the data signal according to gate signal p commonly applied thereto. Similarly, gates 53 and 54 operate to pass data in response to a common gate signal (p). It will be noted by those skilled in the art that gate signals p and (p), provided to gates 51, 52 and gates 53, 54, respectively, have opposite active periods such that one is active while the other is not, and vice versa. Second memory and third memory 55 and 56 are provided for temporarily storing the current line of data as well as the compensating data. Each memory has the same storage capability as first memory 42. One memory unit is controlled to be in the write mode while the other is controlled to be in the read mode, as will be described more fully hereinbelow, by read/write signals j and t, which signals are alternately provided along with address data i and s. Memory units 55 and 56 are enabled by chip enabling signal q, which signal is common to each unit.

While two memory units are used in the preferred embodiment in order to mitigate the burden of operating at high speed, it will be apparent to those skilled in the art that it is not necessary to use two memories 55 and 56. Further, if the compensating data forming circuit is modified to provide all 2048 data bits in parallel, then there would be no need for either the second memory 55 or third memory 56.

First address counter 57 generates address data i in accordance with line start pulse a and first clock e. Address data i is used for writing and reading the previous print data (first memory 42) and for writing the current data and the compensating data (second and third memory 55 and 56). The address data, at least the compensating data, should be rotated every line so as to store the current data in the area where the oldest previous data has been stored. Therefore, first address counter 57 is provided with an address converter within it. Although the address data from first address counter 57 is used commonly for the previous data and the compensating data in this embodiment, individual address data may be used.

Second address counter 58 generates address data s in accordance with line start pulse a and first clock i. Address data is is used for reading out the current data and the compensating data for use by the thermal printing head. It should be rotated so that the data is read out of and delivered to the thermal printing head via the arrangement of latches 721–728 and P/S converters 731–738. Selector 59 switches read/write signals t and j, address data i and s, chip enabling signal q and gate signal p every period or line, according to select signal b. Second controller 61 includes a counter, decoder, flip-flops and gates. Second controller 61 generates the above mentioned select signal b, gate signals h and p, read/write signal j, and chip enabling signals k and q on the basis of line start pulse a, first clock e and the second clock.

Third controller 71 generates latch pulse u, load pulse w, shift clock x, printer latch pulse y and print enabling signal z according to line start pulse a, first clock e, the second clock and address data s. Address data is utilized to generate latch pulse v for selectively latching data into latches 721 through 728. Each latch 721 through 728 latches the data passed through gate 52 or 54 only when its own latch pulse is applied. P/S converters 731 through 738 first receive the respective data output of latches 721 through 728 when a common load pulse w is applied. The data, received in eight-bit parallel form, is provided as serial output in a bit by bit manner. The serial output from P/S converters 731–738 is delivered to respective shift registers and latches of driving circuit 21, in response to shifting clock x. After all the data has been received by the latches of driving circuit 21, the data is latched in response to printer latch pulse y and then printed during the low period of the print enabling signal.

A description of the operation from the view of the whole embodiment is as follows. Line start pulse a is provided each time a current line of data N is to be processed. The data of current line N is provided to latch 32 in serial form.

In the first step (ST1), the first eight bits of this current line N are taken into latch 32. The latched data, shown in FIG. 2*f*, appears as the output of latch 32 during the "low" period of gate signal g. At this time gate signal h and signal j, provided to gate 41, are "low" causing gate 41 to pass the above data to first memory 42. Address data i, read/write signal j ("low", i.e., "write") and chip enabling signal k are also supplied to first memory 42 such that the data is stored therein. At this time either second memory 55 or third memory 56 will be in the write mode, as described above. Assuming that second memory 55 is in the write mode, then address data i, chip enabling signal q and read/write signal j will also be supplied to second memory 55. Concurrently, gates signal p will be supplied to gate 51 and 52 such that the data of current line N is stored in second memory 55. Furthermore, the data of current line N is simultaneously latched into latch 43 in response to latch pulse m.

In the second step (ST2), address data i read/write signal j ("high", i.e., "read") and chip enabling signal k are supplied to first memory 42 such that the first memory will read out eight bits of previous data N−1 which correspond to the latched eight bits of current data. At the same time, gate signal h, and read/write signal j ("high", i.e., "read") are provided to gate 41 such that it transfers the eight-bits of previous data from first memory 42 to latch 44. This data is then latched into latch 44 by means of latch pulse n.

In the third step (ST3), the compensating data is formed on the basis of the data of the current line N and the data of the previous line N−1. The compensating data is stored in second memory 55 via gates 46 and 51 in response to gate signals o and p, respectively. Address i, read/write signal j ("low", i.e., "write") and chip enabling signal q are supplied to second memory 55 along with the compensating data.

In the fourth step (ST4), the eight bits of previous data N−2 are read out of first memory 42. In the fifth step (ST5), the compensating data derived from the current line of data and the data of the previous line N−2 is stored in second memory 55. Similarly, through the sixth and seventh steps (TS6 and ST7), the compensating data with respect to previous line N−3 is formed and stored in second memory 55.

Thus, for every eight bits of current data stored in memory there are 24 bits of compensating data, eights bits for each of the three previous periods. The current data and compensating data are successively stored in memory, eight bits at a time, until all four lines hve been stored (one line of current data and three lines of compensating data).

While data is being stored in second memory 55, as described above, data is being read from memory 56 to be printed via printing head 20. In the present embodiment, memory 55 and 56 are used in conjunction such that data which has been stored in memory 56 during the previous period (while data was being printed from memory 55) is printed in the present period (while data is being stored in memory 55). Data to be printed is read out from the third memory 56, in units of eight bits.

Latch pulse v is generated and is delivered to latches 721 through 728 sequentially every time eight bits of data u are read out from memory 56 (or 55). Load pulse w is generated every eight latch pulses v to cause the eight bits of latched data to be loaded into respective P/S converters 721 through 728. The loaded data is read out in serial form according to shifting clock x and is transferred to the shift register and latch of driving circuit 21, as described above. One shift register and latch is composed of 256 bits. Therefore, the above read out and transfer operation is repeated 32 times. After the first current line of 2048 bits of data are transferred into the shift register of driving circuit 21, the data is latched according to latch pulse y. As soon as the data is latched, the transfer of the next data, i.e., the first line of compensating data formed from the data of previous line N−1, is started. At the same time, a print enabling signal z is applied to the thermal printing head 20, causing it to print the current line of data in the period $T_0$. Similarly, the printing for each line of compensating data, N−1, N−2 and N−3, is performed in periods $T_1$, $T_2$ and $T_3$, respectively. These periods $T_0$, $T_1$, $T_2$ and $T_3$ taper in length such that the period $T_1$ has longer period than period $T_2$ which has a longer period than period $T_3$. This is so that the most recent period provides the most compensation.

With reference to FIG. 3, there is provided an illustrative diagram of the cocept of cmpensation. FIG. 3 shows all combinations of a series of four bits on the current line N with four bits of three previous lines N−1, N−2 and N−3. Combinations 1 through 8 are those in which the bit on the current line corresponds to "white" or "no print" data. In this case no data (either current or compensation) is printed as shown by the dotted line in FIG. 3. Conversely, when the bit on the current line N is "black", as in combinations 9 through 16, the current data N is printed in period $T_0$. Compensating data, N−1, N−2 and N−3 is printed in respective periods $T_1$, $T_2$, and $T_3$ if the previous data was no print, corresponding to white. Thus, if the previous data caused a print, then to compensate the present printing depth for the previous action we will not print.

Although in this embodiment print enabling periods are not completely continuous, i.e., slight pause periods exist between successive periods T, it will be appreciated that a completely continuous print period could be provided. In that case, the data would have to be transferred to the printing head very rapidly.

Figure 4A:
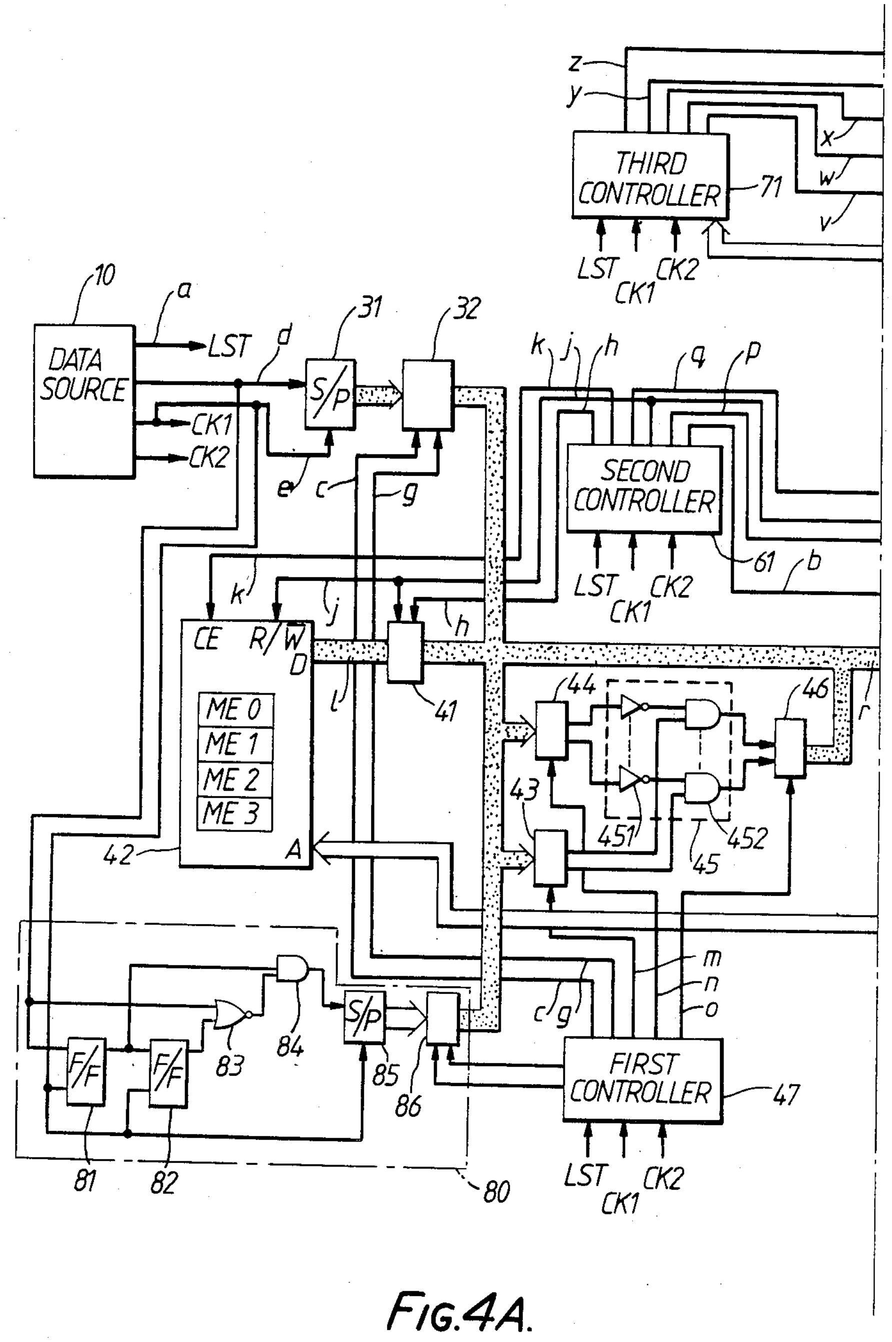
FIG. 4 shows another embodiment of the present invention in block diagram form.
Figure 4B:
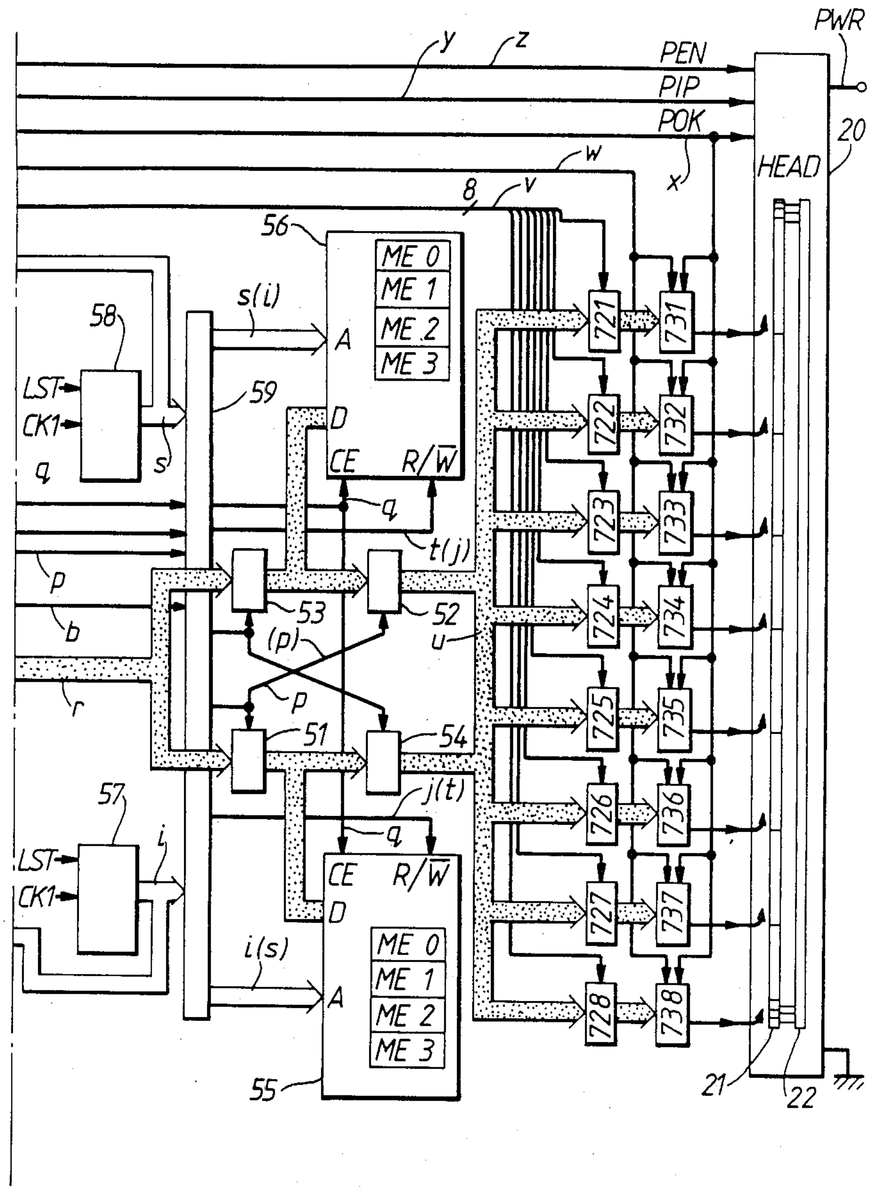
Figure 5:
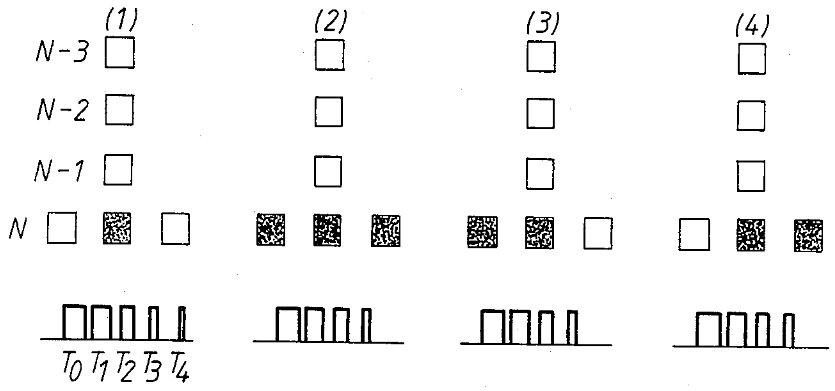
FIG. 5 (1 thru 4 parts) is an illustration of the concept of compensation for the embodiment shown in FIG. 4.

FIG. 4 shows another embodiment of the present invention. In this embodiment, compensation with respect to not only the print history but also the influence of bits on the same line adjacent the current bit is made. Second compensating data forming unit 80 is added to provide this added compensation. Additionally, second and third memories 55 and 56 are changed to have additional storage capacity ME4. Furthermore, the first, second and third controllers 47, 61 and 71 are changed to control respective associated components to operate at a higher speed. First controller generates the latch pulse and the gate signal for the operation of second compensating data forming unit 80. This unit 80 includes flip-flop 81 and 82 for delaying the input data for one bit time. NOR gate 83, AND gate 84, S/P converter 85 and gate 86 are also provided. The concept of this compensation circuit is to provide compensating data which is "black" when both bits adjacent the current bit, one on either side, are "white" and the current bit is "black", as shown in FIG. 5. When the compensating data is "black", it is printed in the divided print period $T_4$, following periods $T_0$ through $T_3$, as shown by example 1 in FIG. 5. The former partial logic is performed by NOR gate 83, and the latter by AND gate 84.

It will be apparent to those skilled in the art that alternative logic might be used. Further, the order and/or length of the divided print periods might be changed. Particularly, the compensating data may be printed before the current data. Also, the length of divided print periods might be controlled to be variable in accordance with the printing velocity. The amount of compensating data might be reduced or increased in accordance with the printing velocity.

While only a few embodiments of the invention have been set forth in the foregoing specification, it will be apparent to those skilled in the art that numerous changes may be made without departing from the spirit and principles of the invention.

We claim:

1. In a thermal printing apparatus having a thermal printing head with a line of heat generating elements and switch means for selectively enabling each of said elements, a printing method comprising the steps of:

providing a line of current data to be printed;

forming first print compensating data with respect to every element from every bit of the line of current data and a corresponding bit of the previous line of data;

forming second print compensating data with respect to every element from every bit of the line of current data and a corresponding bit of the line before the previous line of data; and supplying said switch means with the current data, the first and second print compensating data, and respective print enabling signals separated in time and having time periods tapered in length such that said thermal printing head will print the current data and the first and second print compensating data according to the separated and tapered print enabling signals respectively.

2. In a thermal printing apparatus having a thermal printing head with a line of heat generating elements, a printing method comprising:

providing a line of current data to be printed;

forming first print compensating data from every bit of the line of current data and a corresponding bit of the last line;

forming second print compensating data from every bit of the line of current data and a corresponding bit of the line before the last line;

forming third print compensating data from at least two adjacent bits of the line of current data and providing the current data, the compensating data and respective print enabling signals separated in time to said thermal printing head such that said thermal printing head will print the current data, and the first, second and third compensating data according to the separated print enabling signals.

3. In a thermal printing apparatus having a thermal printing head with a line of heat generating elements, said thermal printing apparatus comprising;

data providing means for providing a current line of data to be printed;

compensating data forming means for forming first print compensating data from every bit of the current data and a corresponding bit of the last line and forming second prind compensating data from every bit of the line of current data and a corresponding bit of the line before the last line; and controlling means for supplying said thermal printing head with said current line of data and said first and second print compensating data, said controlling means being further adapted to provide print enabling signals separated in time and having time periods tapered in length to permit said thermal printing head to print said current data and said first and second print compensating data sequentially.

4. The thermal printing apparatus according to claim 3 further comprising memory means for storing said current data and said compensating data, said controlling means being further adapted to control the read/write operation of said memory means.

5. The thermal printing apparatus according to claim 4 wherein said memory means comprises first and second memories, and wherein said controlling means controls said first memory to be in the read mode when said second memory is in the write mode and further controls said first memory to be in the write mode when said second memory is in the read mode such that said first and second memories alternate modes at a time prior to printing each line of current data.

6. A thermal printing apparatus having a thermal printing with a line of heat generating elements, said thermal printing apparatus comprising;

data providing means for providing data to be printed;

previous data storing means coupled to said data providing means for storing the data to be printed;

compensating data forming means for forming first and second print depth compensating data, said compensating data forming means being coupled to said data providing means and said data storing means for forming the first compensating data from each bit of data to be printed and a corresponding bit of stored last line of data and forming the second compensating data from each bit of data to be printed and a corresponding bit of stored line of data one line before the last line; and controlling means for controlling said thermal printing head to print the current data and the first and second printing depth compensating data by means of print enabling signals having time periods tapered in length, successively.

7. The thermal printing apparatus according to claim 6 further comprising print memory means for storing the data to be printed and the compensating data, said controlling means being further adapted to control the read/write operation of said print memory means.

8. The thermal printing apparatus according to claim 7 wherein said data to be printed is provided in units corresponding to a line of current data, and wherein said print memory means comprises first and second print memories, said controlling means being adapted to control said first print memory to be in the read mode when said second print memory is in the write mode and to control said first print memory to be in the write mode when said first print memory is in the read mode such that said first and second memories alternate modes at a time prior to printing each line of current data to be printed.

9. A thermal printing apparatus having a thermal printing head with a line of heat generating elements said thermal printing apparatus comprising;

data providing means for providing a current line of data to be printed;

compensating data forming means for forming first print depth compensating data from every bit of the line of current data and a corresponding bit of the last line and forming second print depth compensating data from adjacent bits of the current line of data; and controlling means for controlling said printing head to print the current data and the first and second print depth compensating data by means of respective print enabling signals, successively.

10. The thermal printing apparatus according to claim 9 further comprising memory means for storing the current data and the compensating data, said controlling means being further adapted to control the read/write operation of said memory means.

11. The thermal printing apparatus according to claim 10 wherein said memory means comprises first and second memories, said controlling means being adapted to control said first memory to be in the read mode when said second memory is in the write mode and said first memory to be in the write mode when said second memory is in the read mode such that said first and second memories alternate modes at a time prior to printing each line of current data.

* * * * *